(12) United States Patent
Hultkvist

(10) Patent No.: US 10,442,379 B2
(45) Date of Patent: Oct. 15, 2019

(54) BUMPER

(71) Applicant: Gestamp Hardtech AB, Lulea (SE)

(72) Inventor: Jakob Hultkvist, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 15/777,689

(22) PCT Filed: Dec. 9, 2016

(86) PCT No.: PCT/SE2016/051242
§ 371 (c)(1),
(2) Date: May 21, 2018

(87) PCT Pub. No.: WO2017/111682
PCT Pub. Date: Jun. 29, 2017

(65) Prior Publication Data
US 2018/0370470 A1 Dec. 27, 2018

(30) Foreign Application Priority Data
Dec. 21, 2015 (SE) ...................................... 1551680

(51) Int. Cl.
*B60R 19/34* (2006.01)
*B60R 19/02* (2006.01)
*B60R 19/18* (2006.01)

(52) U.S. Cl.
CPC ............ *B60R 19/34* (2013.01); *B60R 19/023* (2013.01); *B60R 19/18* (2013.01)

(58) Field of Classification Search
CPC ........ B60R 19/34; B60R 19/18; B60R 19/023
USPC ........................................................... 293/133
See application file for complete search history.

(56) References Cited

U.S. PATENT DOCUMENTS

| 7,077,442 | B2 * | 7/2006 | Arns ..................... B60R 19/34 293/132 |
| 7,357,432 | B2 * | 4/2008 | Roll ...................... B60R 19/18 293/120 |
| 8,047,588 | B2 * | 11/2011 | Fang ....................... F16F 7/12 293/132 |
| 9,527,464 | B2 * | 12/2016 | Clauser .................. B60R 19/24 |

FOREIGN PATENT DOCUMENTS

| DE | 10 2013 100720 | 7/2014 |
| DE | 102013015421 | 4/2015 |
| WO | WO/2007/136319 | 11/2007 |
| WO | WO 2008/057025 | 5/2008 |
| WO | WO2012/042396 | 4/2012 |
| WO | WO 2005/054011 | 6/2015 |
| WO | WO 2015/133949 | 9/2015 |

* cited by examiner

*Primary Examiner* — Pinel E Romain
(74) *Attorney, Agent, or Firm* — Mark P. Stone

(57) ABSTRACT

A bumper (B), comprising an elongated hat-shaped cross beam (1) mounted to at least two crash boxes (2) which are attached to a vehicle, said cross beam (1) having a primary contact face in the form of bent longitudinal upper and lower flanges (3,4). The bent longitudinal upper and lower flanges being arranged in the direction of the cross beam (1), and said primary contact face is facing away from the vehicle. Said bent longitudinal upper and lower flanges (3,4) have each a portion (5) with a large inner radius (R) at least at the mounting site of the cross beam (1) to respective crash box (2) compared to a small inner radius (r) of the rest of each of the bent longitudinal upper and lower flanges (3,4).

20 Claims, 7 Drawing Sheets

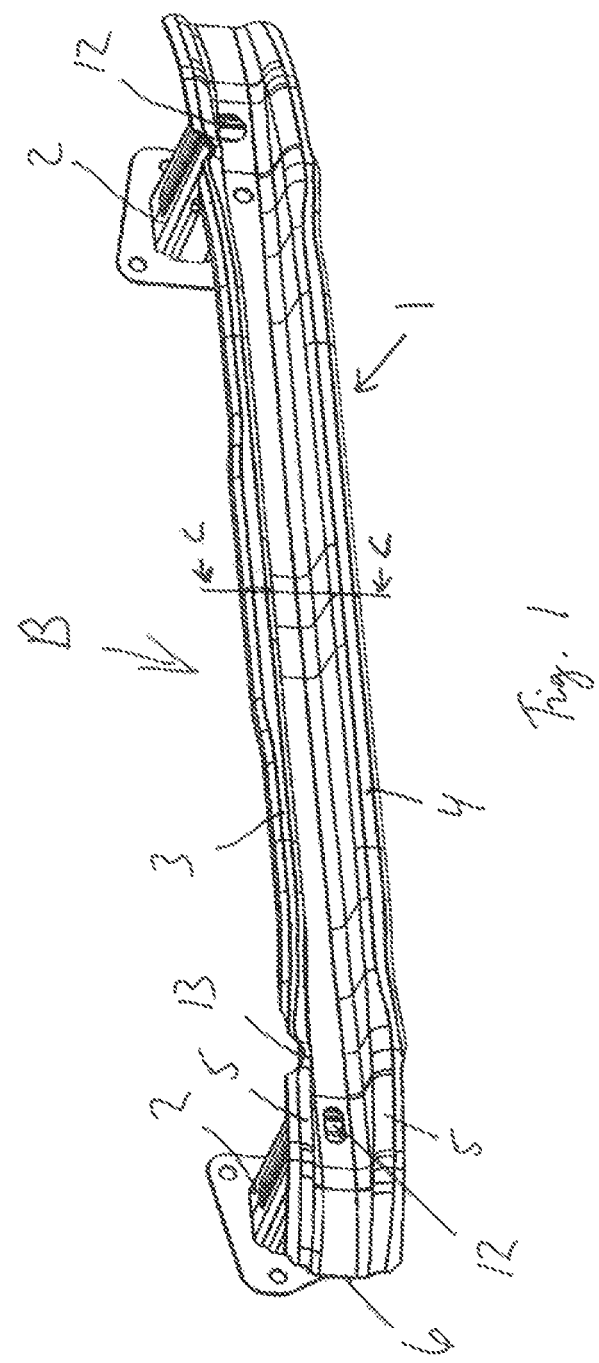

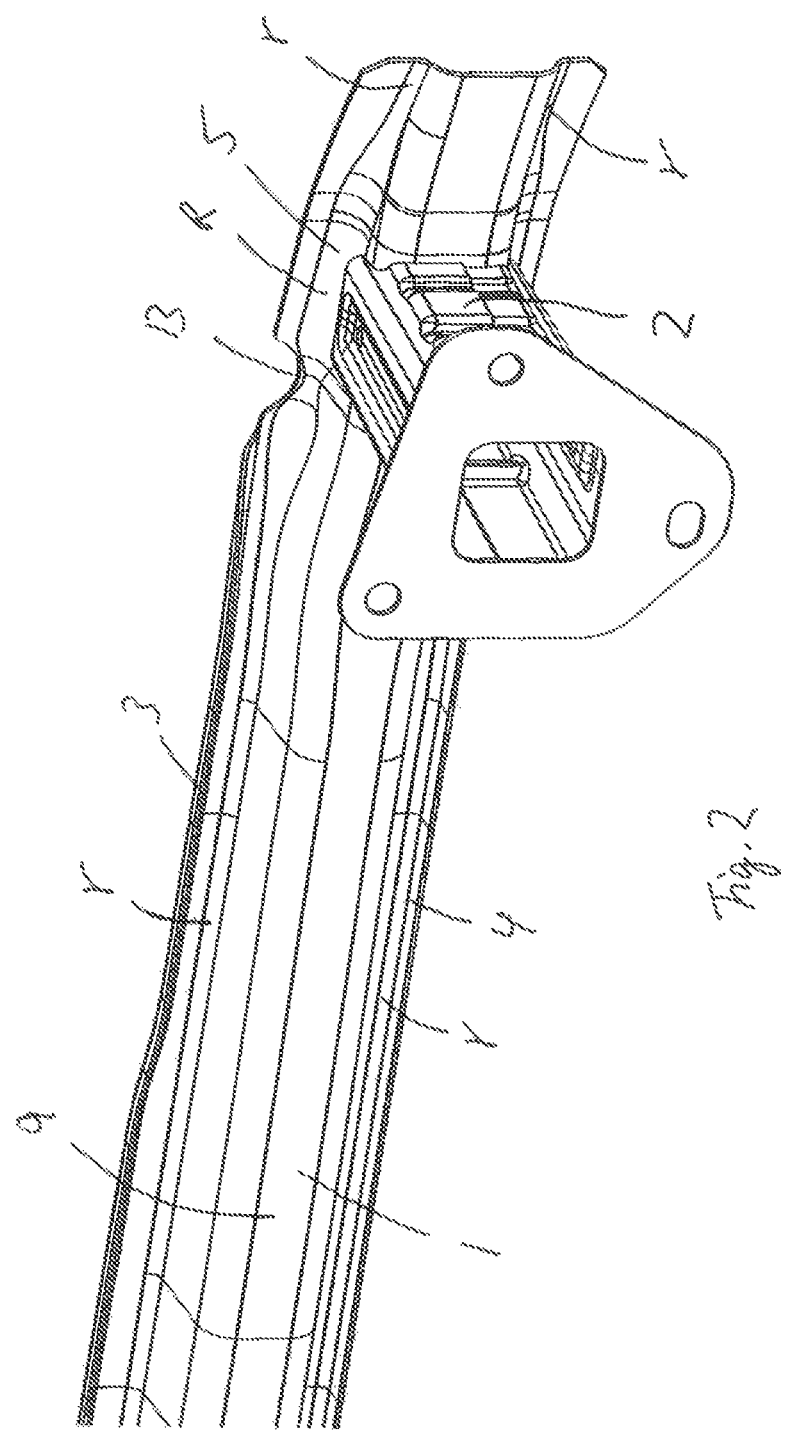

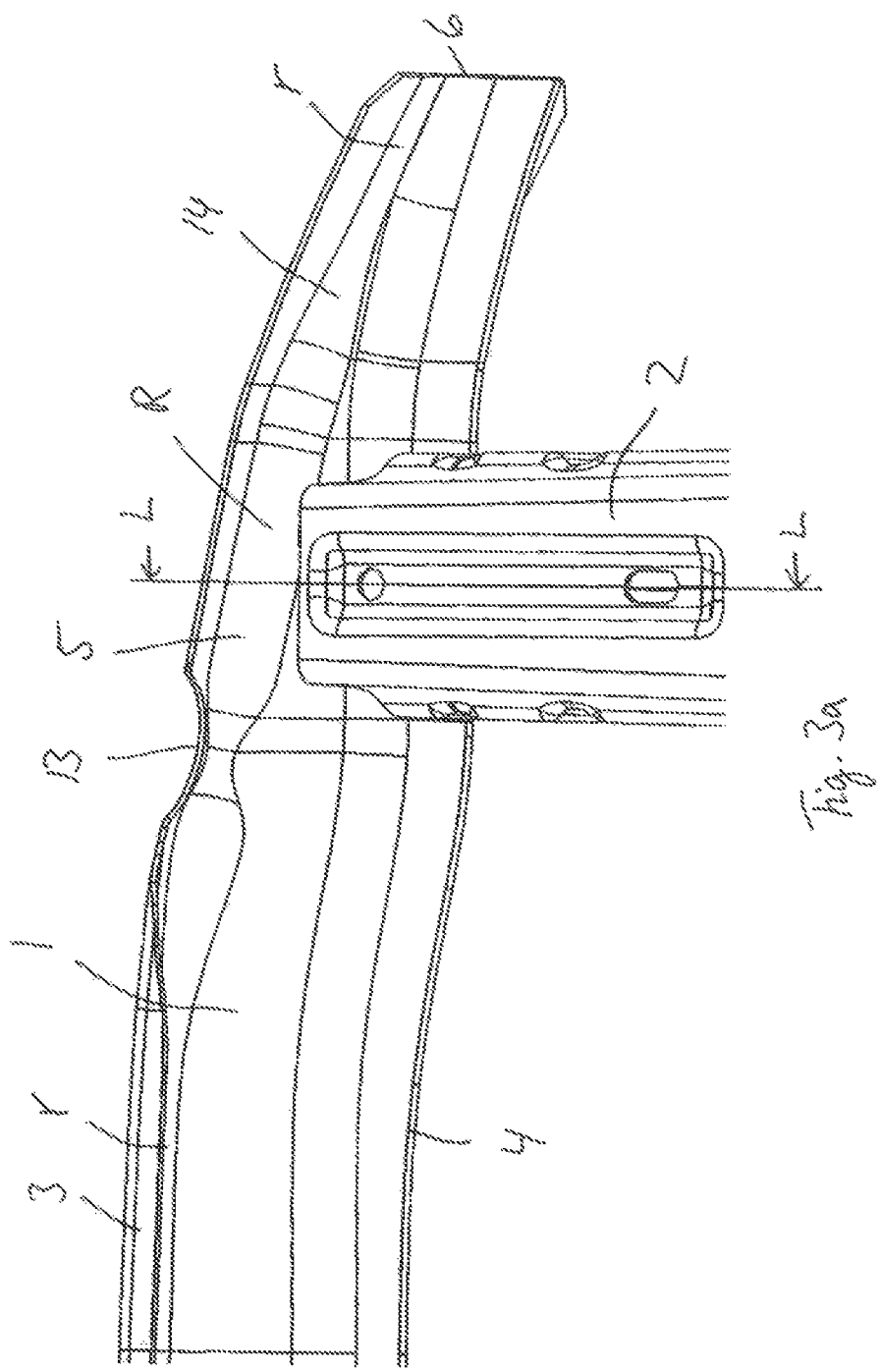

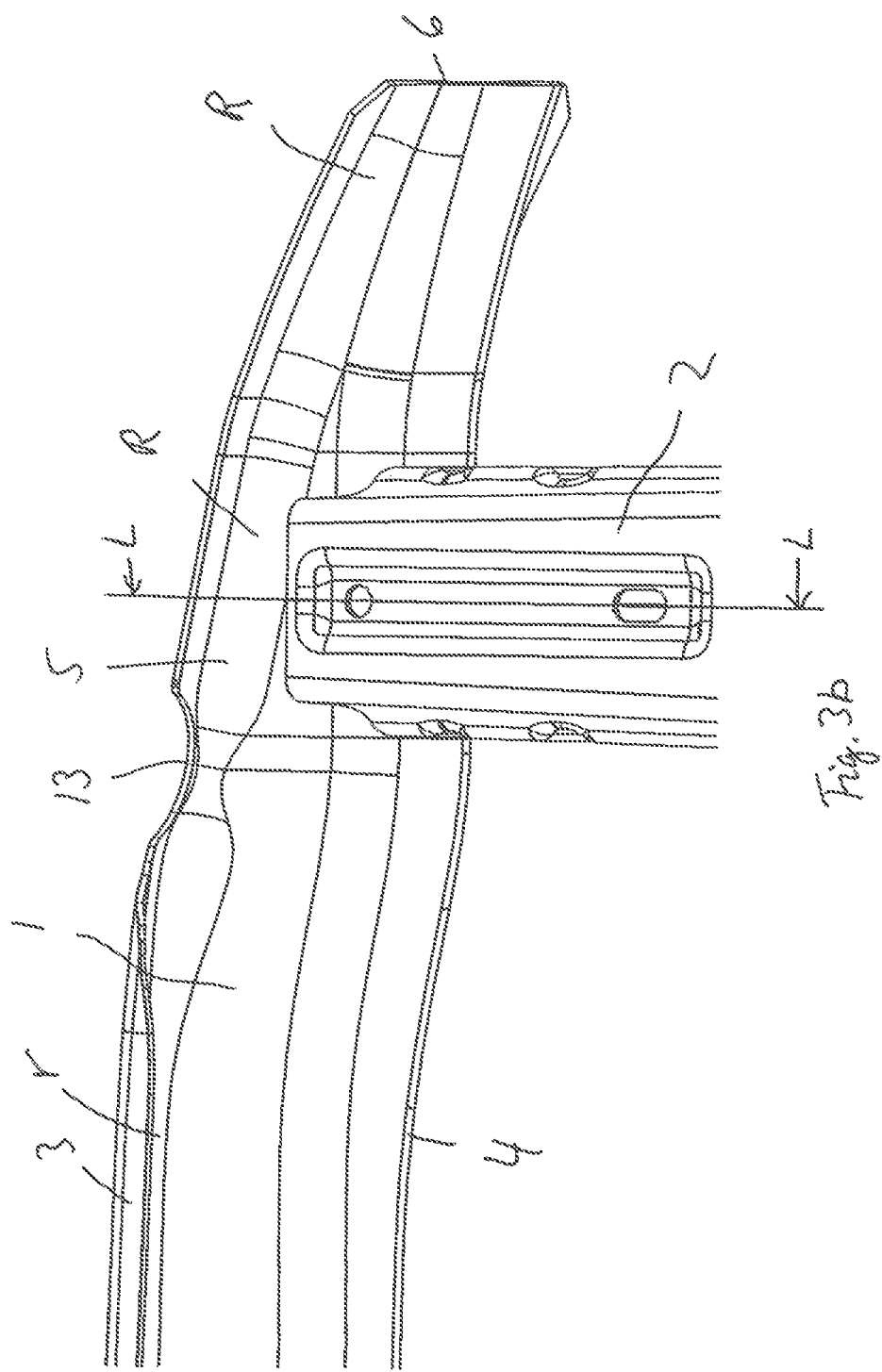

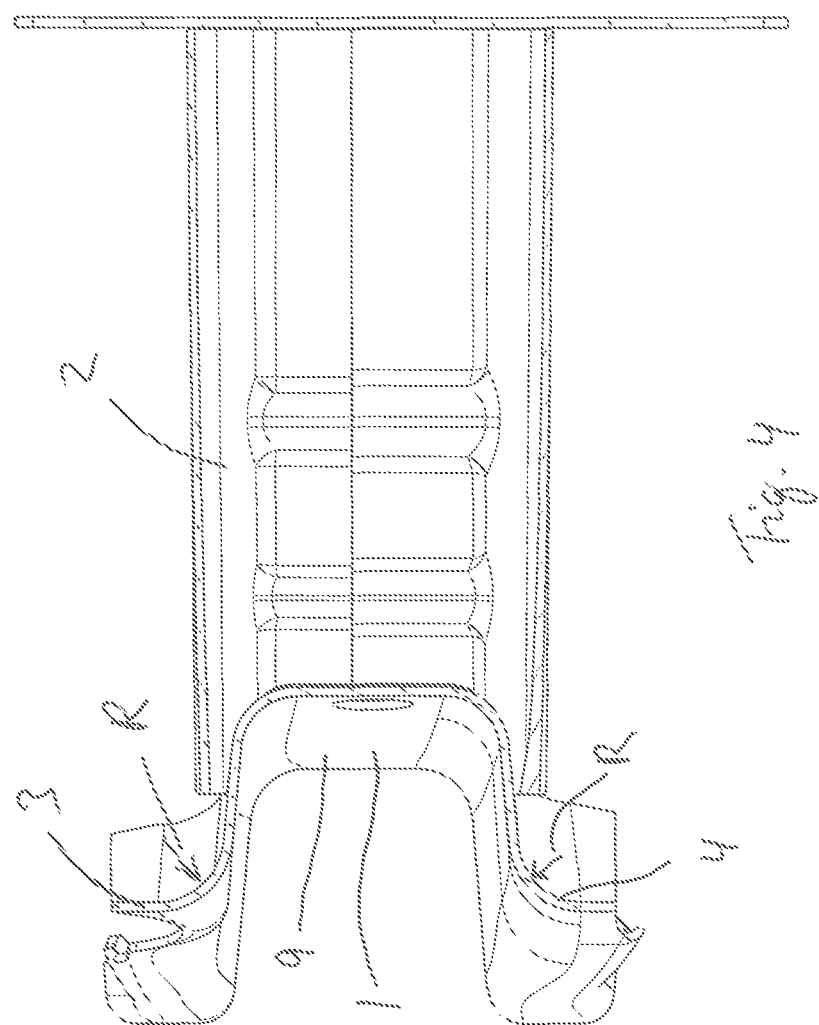

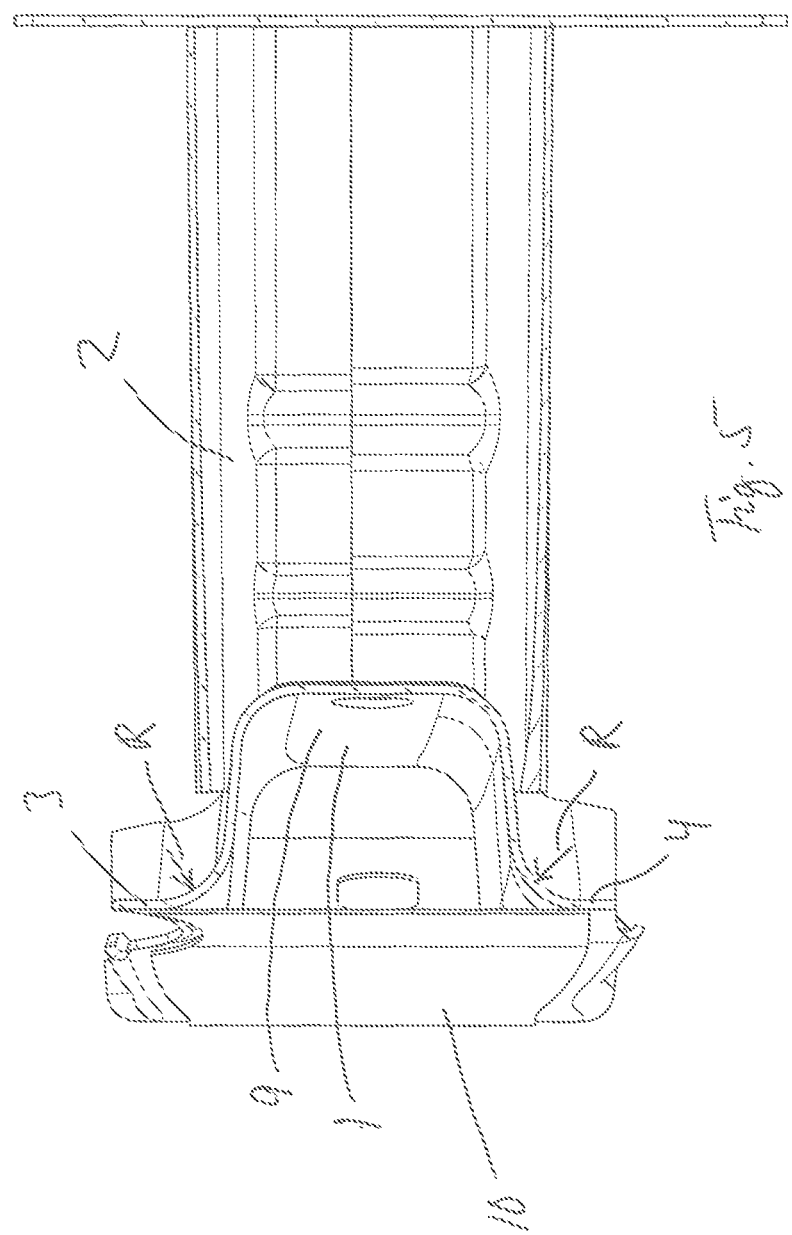

BUMPER

FIELD OF THE INVENTION

The invention relates to a bumper according to the preamble of claim 1, and more particular to a bumper having a cross beam with bent longitudinal upper and lower flanges having each at least a portion with partially variable radius.

BACKGROUND OF THE INVENTION

One of the crash test performed to a bumper is the RCAR Allianz Crash Repair test, commonly known as the AZT crash test. In said test the AZT barrier has a mass of 1400 kg, it impacts the bumper of the vehicle with a velocity of 16 km/h and at an impact angle of 10° which often results in an undesired high peak load at the beginning of the load curve when measuring force over time.

An optimal behavior of the bumper in the test would be a constant high load over time, i.e. the cross beam of the bumper should deform and "cushion" the initial peak load before the crash box/boxes of the bumper starts to buckle.

OBJECT OF THE INVENTION

An object of the invention is to achieve a bumper having a cross beam which reduces or eliminates the undesired high peak load at the beginning of the load curve during the AZT crash test or any other offset crash test.

A further object is to achieve a bumper having a cross beam with a reduce weight, but yet having as high constant load as possible over time during the AZT crash test or any other offset crash test.

BRIEF DESCRIPTION OF THE INVENTION

According to the invention these objects are achieved by a bumper, comprising an elongated hat-shaped cross beam mounted to at least two crash boxes which are attached to a vehicle, said cross beam having a primary contact face in the form of bent longitudinal upper and lower flanges, said bent longitudinal upper and lower flanges being arranged in the direction of the cross beam, said primary contact face is facing away from the vehicle, characterized in that said bent longitudinal upper and lower flanges have each a portion with a large inner radius at least at the mounting site of the cross beam to respective crash box compared to a small inner radius of the rest of each of the bent longitudinal upper and lower flanges.

Preferred embodiments are defined in the dependent claims.

BRIEF DESCRIPTION OF THE DRAWINGS

The invention is described in more detail below with reference being made to non-limiting examples shown on the appended drawings, in which FIG. 1 is front view of a bumper with a cross beam having variable radius of at least a part of bent longitudinal upper and lower flanges according to the invention, FIG. 2 is view of a portion of the cross beam shown in FIG. 2 from behind with mounted crash box, FIG. 3a is a view obliquely from above and behind of a portion of the cross beam with mounted crash box at which the radius of the bent longitudinal upper and lower flanges decreases towards the respectively end of the cross member, FIG. 3b is a view similar to the one shown in FIG. 3a but in which the radius of the bent longitudinal upper and lower flanges is maintained unchanged towards the respectively end of the cross member, FIG. 4 is a cross sectional view of the crash box with mounted cross beam taken at section L-L in FIG. 3b, FIG. 5 is a cross sectional view of the crash box with mounted cross beam shown in FIG. 4 having a cover member, and FIG. 6 a diagram showing the load curve when measuring force over time for three cross beams with bent longitudinal upper and lower flanges having different radiuses at an area in the vicinity of a crash box.

DESCRIPTION OF PREFERRED EMBODIMENTS

Figure 6:
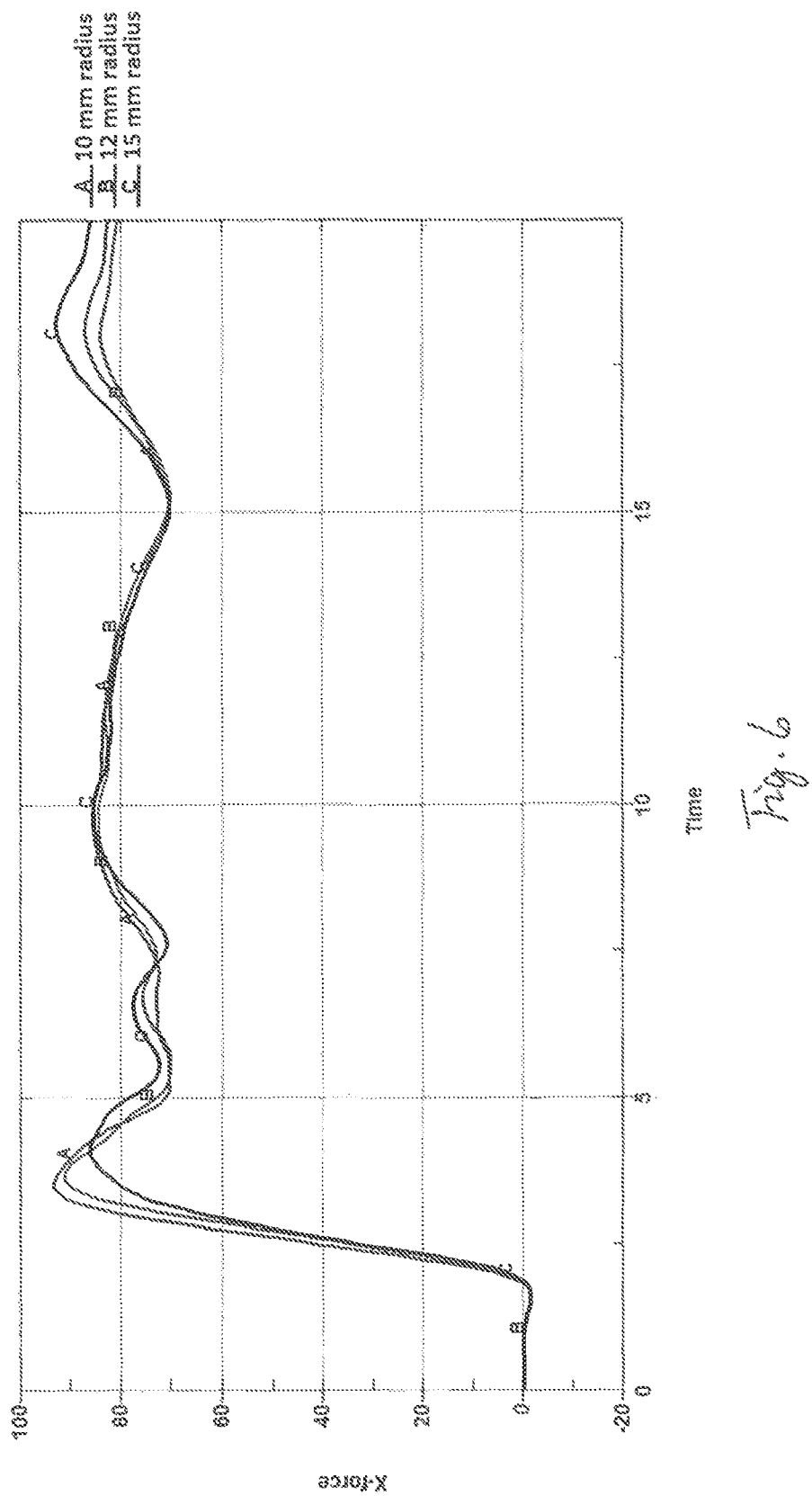

As seen in FIGS. 1 to 5 the bumper B comprises a cross beam 1 and at least two crash boxes 2 mounted on the back side/U-shaped side of the cross beam. The crash boxes are attached to a vehicle (not shown). The cross beam 1 has a primary contact face in the form of bent longitudinal upper 3 and lower flanges 4 for primary contact with the AZT barrier during the AZT crash test.

According to the invention, for enabling the cross beam of the bumper to deform and "cushion" the initial peak load during the AZT crash test or any other offset crash test, before the crash box(es) of the bumper starts to buckle, the bent longitudinal upper and lower flanges 3, 4 have each a portion 5 (see FIGS. 3a and 3b, for instance) with a larger inner radius R at least at the mounting site of the cross beam 1 to respective crash box 2 than the inner radius of the rest of the bent longitudinal upper and lower flanges 3, 4.

Preferably, the cross beam 1 is hat-shaped as seen in cross section (see FIGS. 4 and 5) and may be provided with a cover plate 10 (FIG. 5). The purpose of the cover plate 10 is to keep the bent longitudinal upper 3 and lower flanges 4 from separating during the AZT crash test and is arranged on the front side of the cross beam 1. The cover plate 10 also contributes to the stiffness of the cross beam 1 which increase performance in certain crash tests, such as RCAR "bumper to bumper" crash test.

As seen in FIGS. 1 to 5, the cross beam 1 is preferably attached to respective crash box 2 in such a way that a centre web section 9 of the cross beam 1 is directed towards and protrudes into said respective crash box.

Thus, according to the invention at least a portion of the bent longitudinal upper 3 and lower flanges 4 of the cross beam should have variable radius. More particularly, the large inner radius R of said portion 5 of each of the bent longitudinal upper and lower flanges 3, 4 at or in the vicinity of the mounting site to respective crash box 2 should be within the interval of 10 to 16 mm, preferably 11 to 14 mm, and most preferably 12 to 13 mm. The small inner radius r of the rest, i.e. the parts of each of the bent longitudinal upper and lower flanges 3, 4 on both sides of the portion 5, should be in an embodiment within the interval of 5 to 9 mm, preferably 6 to 8 mm. See FIG. 3a.

As seen in FIG. 3a the large inner radius R is progressively transformed via a transformation zone 14 into the small inner radius r at a suitable distance from the centre line L of respective crash box towards respective end 6. Said transformation zone may have a length of 15 to 200 mm.

In another embodiment the large inner radius R of said portion 5 of the bent longitudinal upper and lower flanges 3, 4 at or in the vicinity of the mounting site to respective crash box 2 should be within the interval as stated above, and this large inner radius R of each of the bent longitudinal upper and lower flanges 3, 4 should be the same and continue to respective end 6 of the cross beam 1. See FIG. 3b.

More precisely, in one embodiment said portion 5 with large inner radius R of each of the bent longitudinal upper and lower flanges 3, 4 should extend on the one hand a distance of 25 to 300 mm, preferably 50 to 250, and most preferably 75 to 150 mm, from the centre line L of respective crash box 2 along and towards the centre of the cross beam 1 and on the other hand from said centre line L to respective end 6 of the cross beam 1.

In another embodiment said portion 5 with large inner radius R of each of the bent longitudinal upper and lower flanges 3, 4 should extend a distance of 25 to 300 mm, preferably 50 to 250, and most preferably 75 to 150 mm, on either side from said centre line L of respective crash box 2 along the cross beam 1.

Said distance can be the same or different on either side of the centre line L of the respective crash box.

As can be seen in FIGS. 3a and 3b, the bent longitudinal upper and lower flanges 3, 4 are preferably so bent that the lug of respective upper and lower flanges is directed towards the vehicle, i.e. extends in a horizontal direction. Thus, the bent longitudinal upper and lower flanges 3, 4 are U-shaped at least at the central portion of the cross beam 1. At the portion 5 which extends at least from respective crash box 2 to respective end 6 of the cross beam 1, the lug of respective upper and lower flanges extends preferably in a vertical direction.

Thus, according to the invention by forming at least a portion of the respective longitudinal upper and lower flanges 3, 4 at respective crash box 2 with increased radius, it is possible to reduce the radius of said respective longitudinal upper and lower flanges 3, 4, at least in a middle portion of the cross member. By so doing, it is possible to reduce the section height and/or the thickness of material of the cross beam 1, and thus reduce the total weight of the cross beam 1 and yet maintain the desired stiffness of the cross beam 1 having reduced or eliminated high peak load at the beginning of the load curve during the AZT crash test or any other offset crash test.

As can be inferred from FIG. 2 the cross beam 1 may be provided with different holes 12 for temporary mounting of a tow hook/toe eye, for instance. It may also have one or more indentation(s) 13 for different purposes (see FIG. 2). The cross beam 1 may even be provided with differently bent sections which does not have to be the same with respect to the respective bent longitudinal upper and lower flange 3, 4. Therefore, the profile of the cross beam 1, as seen in cross section at line C-C, for instance, may be unsymmetrical.

FIG. 6 shows a diagram of the load curve when measuring force over time for three cross beams, A with a radius of 10 mm, B with a radius of 12 mm, and C with a radius of 15 mm. As can be inferred, with a cross beam 1 having bent longitudinal upper and lower flanges 3, 4 with particularly a radius of 15 mm the undesired high peak load at the beginning of the load curve will be reduced without reducing the strength of the cross member 1.

In an embodiment not shown the bent longitudinal upper and lower flanges of the cross beam may have different radii.

The variable radius can be applied to any open or closed cross beam which features one or more swept radiuses along the length of the front of the cross beam, in case where an initial cushioning effect is desired in an AZT crash test or any other offset crash test while maintaining the torsional rigidity and bending strength of a cross beam having a small radius.

The invention claimed is:

1. A bumper (B), comprising an elongated hat-shaped cross beam (1) mounted to at least two crash boxes (2) which are attached to a vehicle, said cross beam (1) having a primary contact face formed from bent longitudinal upper and lower flanges (3, 4), said bent longitudinal upper and lower flanges being arranged in the direction of the cross beam (1), said primary contact face is facing away from the vehicle, characterized in that said bent longitudinal upper and lower flanges (3, 4) each have a portion (5) with a large inner radius (R) at least at a mounting site of the cross beam (1) to a respective said crash box (2) as compared to a small inner radius (r) of the remaining portion of each of the bent longitudinal upper and lower flanges (3, 4).

2. The bumper (B) according to claim 1, characterized in that the large inner radius (R) of said portion (5) of each of the bent longitudinal upper and lower flanges (3, 4) at the mounting site to the respective crash box (2) is within an interval of 10 to 16 mm, and that the small inner radius (r) of the rest of each of the bent longitudinal upper and lower flanges (3, 4) is within an interval of 5 to 9 mm.

3. The bumper (8) according to claim 1, characterized in that said portion (5) with large inner radius (R) of each of the bent longitudinal upper and lower flanges (3, 4) extends a distance of between 25 to 300 mm, from a center line (L) of the respective crash box (2) along and towards the center of the cross beam (1) and on the other hand from said center line (L) to a respective end (6) of the cross beam (1).

4. The bumper (B) according to claim 1, characterized in that said portion (5) with large inner radius (R) of each of the bent longitudinal upper and lower flanges (3, 4) extends a distance of between 25 to 300 mm, on either side from a center line (L) of the respective crash box (2) along the cross beam (1).

5. The bumper (B) according to claim 3, characterized in that said distance is equal or unequal relative to the center line L of the respective crash box.

6. The bumper (B) according to claim 1, characterized in that the hat-shaped cross beam (1) is provided with a cover plate (10).

7. The bumper (B) according to claim 1, characterized in that the cross beam (1) has a nonsymmetrical profile as seen in cross section.

8. The bumper (B) according to claim 1, characterized in that each of the bent longitudinal upper and lower flanges (3, 4) of said portion (5) which extends from the respective crash box (2) to a respective end (6) of the cross beam (1) extend in a vertical direction.

9. The bumper (B) according to claim 1, characterized in that each of the bent longitudinal upper and lower flanges (3, 4) is U-shaped at least at the central portion of the cross beam (1).

10. The bumper (B) according to claim 2, characterized in that said portion (5) with large inner radius (R) of each of the bent longitudinal upper and lower flanges (3, 4) extends a distance of between 25 to 300 mm, from a center line (L) of the respective crash box (2) along and towards the center of the cross beam (1) and from said center line (L) to a respective end (6) of the cross beam (1).

11. The bumper (B) according to claim 2, characterized in that said portion (5) with large inner radius (R) of each of the bent longitudinal upper and lower flanges (3, 4) extends a distance of between 25 to 300 mm, on either side from a center line (L) of the respective crash box (2) along the cross beam (1).

12. The bumper (B) according to claim 4, characterized in that said distance is equal or unequal relative to the center line L of the respective crash box.

13. The bumper (B) according to claim 2, characterized in that the hat-shaped cross beam (1) is provided with a cover plate (10).

14. The bumper (B) according to claim 2, characterized in that the cross beam (1) has a nonsymmetrical profile as seen in cross section.

15. The bumper (B) according to claim 2, characterized in that each of the bent longitudinal upper and lower flanges (3, 4) of said portion (5) which extends from the respective crash box (2) to a respective end (6) of the cross beam (1) extend in a vertical direction.

16. The bumper (B) according to claim 2, characterized in that each of the bent longitudinal upper and lower flanges (3, 4) is U-shaped at least at the central portion of the cross beam (1).

17. The bumper (B) according to claim 3, characterized in that the hat-shaped cross beam (1) is provided with a cover plate (10).

18. The bumper (B) according to claim 3, characterized in that the cross beam (1) has a nonsymmetrical profile as seen in cross section.

19. The bumper (B) according to claim 3, characterized in that each of the bent longitudinal upper and lower flanges (3, 4) of said portion (5) which extends from the respective crash box (2) to a respective end (6) of the cross beam (1) extend in a vertical direction.

20. The bumper (B) according to claim 3, characterized in that each of the bent longitudinal upper and lower flanges (3, 4) is U-shaped at least at the central portion of the cross beam (1).

\* \* \* \* \*

UNITED STATES PATENT AND TRADEMARK OFFICE
CERTIFICATE OF CORRECTION

PATENT NO. : 10,442,379 B2
APPLICATION NO. : 15/777689
DATED : October 15, 2019
INVENTOR(S) : Jakob Hultkvist Page 1 of 1

It is certified that error appears in the above-identified patent and that said Letters Patent is hereby corrected as shown below:

In the Claims (Column 4, Line 32): Delete "on the other hand".

Signed and Sealed this
Seventeenth Day of March, 2020

Andrei Iancu
*Director of the United States Patent and Trademark Office*